UNITED STATES PATENT OFFICE.

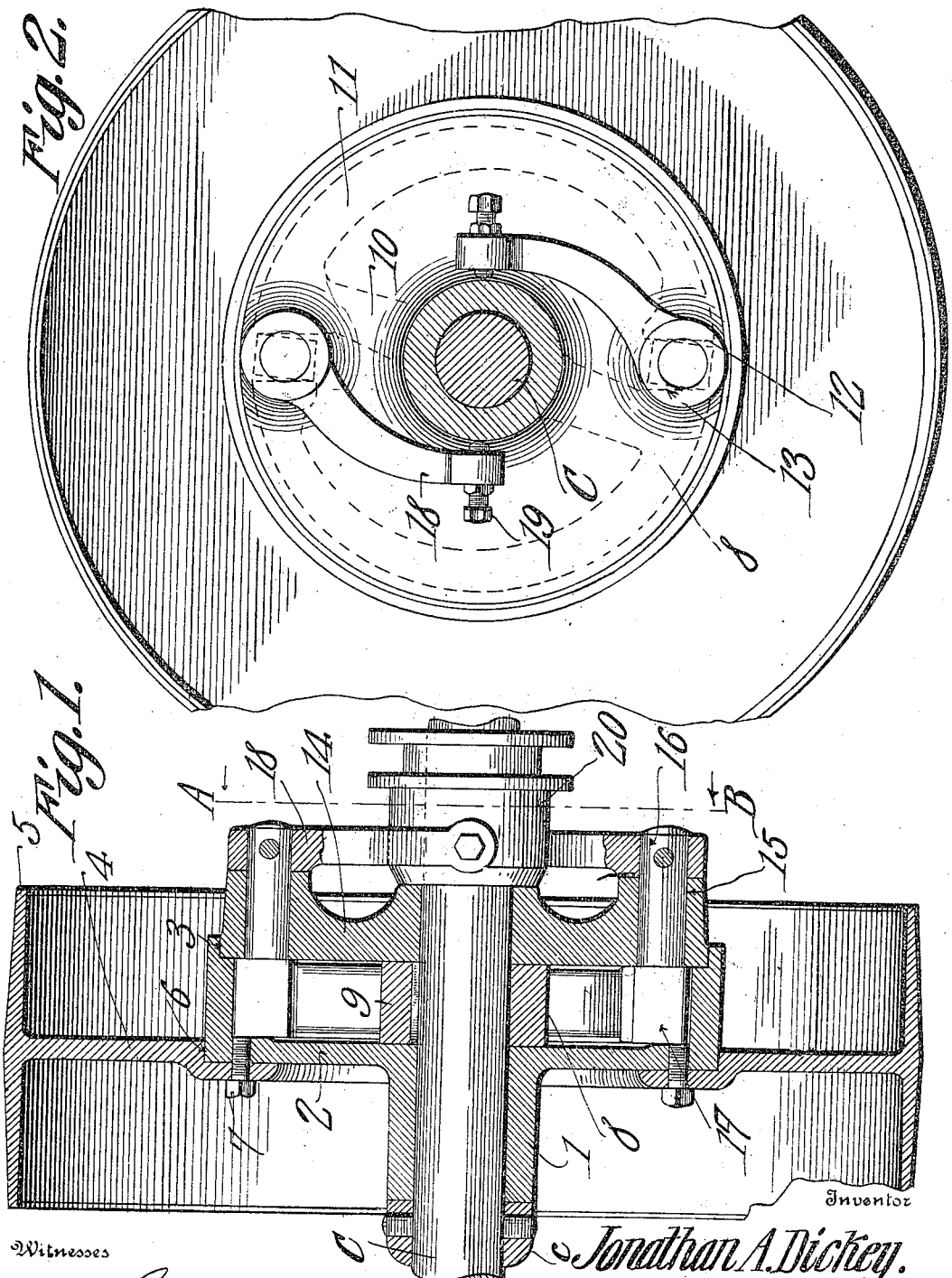

JONATHAN A. DICKEY, OF COLUMBUS, INDIANA.

CLUTCH.

960,515.  Specification of Letters Patent.  Patented June 7, 1910.

Application filed October 11, 1909. Serial No. 522,075.

*To all whom it may concern:*

Be it known that I, JONATHAN A. DICKEY, a citizen of the United States, residing at Columbus, in the county of Bartholomew and State of Indiana, have invented a new and useful Clutch, of which the following is a specification.

This invention relates to clutches for use in connection with pulleys of various types, the object of the invention being to provide simple means whereby a normally loose pulley can be quickly and effectually connected up with a shaft so as to rotate therewith.

Another object is to provide a friction clutch which is formed of but few parts and which will not readily get out of order.

A still further object is to provide a friction clutch the operating parts of which are designed to be actuated by an ordinary shifting cone.

With these and other objects in view, the invention consists of certain novel details of construction and combinations of parts hereinafter more fully described and pointed out in the claim.

In the accompanying drawings the preferred form of the invention has been shown.

In said drawings: Figure 1 is a central section through a pulley having the present improvements combined therewith. Fig. 2 is a section on line A—B of Fig. 1.

Referring to the figures by characters of reference C designates a shaft having a collar *c* secured thereon and contacting with one end of the tubular hub 1 of the clutch case 2, this case being in the form of a hollow cylinder having one face open, there being an interior annular groove or rabbet 3 in the open face of the case. The web 4 of the pulley 5 has a circular recess 6 therein for the reception of the case, said case being secured within the recess by means of screws 7 or in any other preferred manner. It will be apparent therefore that when the pulley has been attached to the case in the manner shown and described the said pulley and case will move together as one body.

The expansible member 8 of the clutch is located within the case 2 and consists of a hub 9 having radially extending spokes 10 which are connected to arcuate arms 11, said arms being concentric with the hub and each terminating in a jaw 12 spaced from a relatively fixed jaw 13 which is formed adjacent one of the spokes 10. It is to be understood that the arms 11 are capable of flexing to a limited extent.

A cap 14, in the form of a circular disk, is loosely mounted on the shaft C and the peripheral portion thereof is designed to rest within the groove or rabbet 3. This cap has diametrically opposed circular openings 15 therein within each of which is mounted a pin 16 designed to partly rotate. Each pin has a head 17 at one end and projecting into the clutch case 2, said head being substantially rectangular in outline and being seated between the adjoining jaws 12 and 13, the width of the head being equal to the normal distance between said jaws. An arm 18 is secured in any suitable manner to each pin 16 and both arms are preferably curved and designed to extend to opposite sides of the shaft C there being an adjusting screw 19 mounted within the free end of each of the arms 18. An ordinary shifting cone 20 is slidably mounted on the shaft C and the tapered end thereof is designed to move between the screws 19 and against the cap 14, this cone thus acting as a spreading means for shifting the arms 18 in opposite directions. It is of course to be understood that the hub 9 of the expansible clutch member is keyed or otherwise secured to the shaft C so as to rotate with it.

Under normal conditions the screws 19 contact with or lie close to the shaft C and the heads 17 of the pins 16 fit snugly between the jaws 12 and 13 of the expansible clutch member, the arms 11 of such member being thus supported out of contact with the inner periphery of the clutch case 2. It will be apparent therefore that the pulley 5 and the clutch case are free to rotate about the shaft. However when it is desired to secure the pulley to the shaft so as to cause the shaft and pulley to rotate together, the cone 20 is shifted by any suitable mechanism in the direction of the cap 14 and the tapered end thereof, in passing between the screws 19, will swing the arms 18 in opposite directions and cause the pins 16 to partly rotate. The heads of these pins will thus be tilted with respect to the jaws 12 and 13 and will operate to spread the jaws apart, thus flexing the arms 11 and forcing them into frictional engagement with the inner periphery of the case 2. Said case will thus be caused to rotate with the revolving clutch element 8 and the pulley will therefore be moved with the shaft. Whenever it is desired to release the pulley it is merely necessary to shift the cone 20 out from between the arms 18 whereupon the heads 17 will be returned to their normal positions by the action of the movable jaws 11.

It will be seen that a friction clutch such as herein described is very simple in construction, it being formed of very few parts, and that it will not therefore readily get out of order. The type of clutch shown in the drawings is particularly designed for high speed pulleys and is advantageous because it is perfectly balanced. If desired however, one of the arms 8 and pins 16 may be dispensed with and a single arcuate arm 11 utilized, this arm extending around the greater portion of the hub of said element 8 and being connected to said hub by a single spoke instead of by two spokes as in the drawing. This construction is so obvious that it is not deemed necessary to illustrate the same.

Various other changes can of course be made in the construction and arrangement of the parts without departing from the spirit or sacrificing any of the advantages of the invention.

What is claimed is:—

The combination with a shaft, of a cylindrical clutch case loosely mounted thereon, said case having an open face, there being an interior annular groove in the open face of the case, a pulley secured to and concentric with the case, a cap disk loosely mounted on the shaft and having its peripheral portion seated within the annular groove in the clutch case, said cap constituting a closure for the open face of the case, an expansible clutching member secured to and revoluble with the shaft, said member being located within the case, an actuating device slidably mounted on the shaft, and means mounted for rotation within the cap disk and actuated by said device for shifting the expansible member into contact with the clutch case.

In testimony that I claim the foregoing as my own, I have hereto affixed my signature in the presence of two witnesses.

JONATHAN A. DICKEY.

Witnesses:
J. ED. JONES,
PEARL L. DENISON.